(12) United States Patent
Martin et al.

(10) Patent No.: US 10,943,195 B2
(45) Date of Patent: Mar. 9, 2021

(54) ASSET MANAGEMENT IN A PROCESS CONTROL SYSTEM

(71) Applicant: Invensys Systems, Inc., Foxboro, MA (US)

(72) Inventors: Peter G. Martin, North Carver, MA (US); Trevor Cusworth, Westford, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 1016 days.

(21) Appl. No.: 14/664,511

(22) Filed: Mar. 20, 2015

(65) Prior Publication Data

US 2016/0275426 A1 Sep. 22, 2016

(51) Int. Cl.
G06Q 10/06 (2012.01)

(52) U.S. Cl.
CPC ....... G06Q 10/06313 (2013.01); G06Q 10/06 (2013.01); *Y02P 90/80* (2015.11)

(58) Field of Classification Search
CPC .. G06Q 10/06; G06Q 10/063; G06Q 10/6313; G06Q 140/00; G06Q 10/06315; G06Q 10/00; F02D 23/02; F02D 4/0007; Y02T 10/144; Y02T 10/40
USPC .............. 290/7; 701/29.3; 702/60; 705/7.28, 705/7.11; 235/375; 700/36
See application file for complete search history.

(56) References Cited

U.S. PATENT DOCUMENTS

| | | | |
|---|---|---|---|
| 5,864,183 A | 1/1999 | Fisher, Jr. et al. | |
| 6,068,012 A | 5/2000 | Beardwood et al. | |
| 6,128,540 A * | 10/2000 | Van Der Vegt | G06Q 10/04 700/36 |
| 6,490,506 B1 | 12/2002 | March | |
| 6,510,368 B1 | 1/2003 | Beardwood et al. | |
| 6,993,403 B1 * | 1/2006 | Dadebo | G05B 23/0294 700/108 |
| 7,328,078 B2 * | 2/2008 | Sanford | G05B 23/0245 700/108 |
| 7,899,591 B2 | 3/2011 | Shah et al. | |
| 8,060,397 B2 | 11/2011 | Neumaier et al. | |
| 8,417,360 B2 | 4/2013 | Sustaeta et al. | |
| 8,533,022 B2 | 9/2013 | Nair | |

(Continued)

OTHER PUBLICATIONS

Extended European Search Report for 16161298.1 dated May 23, 2016.

*Primary Examiner* — Mehmet Yesildag
(74) *Attorney, Agent, or Firm* — Stinson LLP

(57) ABSTRACT

A system for improving production of a process control system comprises a processor, sensors connected to one or more assets in the process control system, human-machine interfaces, and a storage memory storing instructions for execution on the processor. The system receives process data via the sensors and determines an input cost of the one or more assets and an output value of the one or more assets. The system provides a net production value of the one or more assets based on the determined input cost and output value. The system stores the input cost, output value, and net production value on a storage memory and provides the input cost, output value, and net production value along with critical asset performance information of asset value, asset performance and opportunity costs for each asset and asset set in the operation to a user via the human-machine interfaces.

16 Claims, 11 Drawing Sheets

(56) References Cited

U.S. PATENT DOCUMENTS

| | | | | |
|---|---|---|---|---|
| 2001/0004520 | A1* | 6/2001 | Nomoto | G06Q 10/06 434/109 |
| 2002/0023044 | A1* | 2/2002 | Cichanowicz | G06Q 10/063 705/37 |
| 2002/0038235 | A1* | 3/2002 | Musafia | G06Q 10/06 705/7.25 |
| 2003/0150908 | A1* | 8/2003 | Pokorny | G05B 13/0285 235/375 |
| 2003/0150909 | A1* | 8/2003 | Markham | B23Q 35/12 235/376 |
| 2004/0153437 | A1 | 8/2004 | Buchan | |
| 2006/0081513 | A1* | 4/2006 | Kenny | B03B 9/06 209/672 |
| 2007/0033127 | A1* | 2/2007 | Masuyama | G06Q 40/06 705/36 R |
| 2007/0091355 | A1* | 4/2007 | Rai | G06Q 10/06 358/1.15 |
| 2007/0293969 | A1* | 12/2007 | Hirai | H05K 13/0885 700/114 |
| 2008/0140356 | A1* | 6/2008 | Sanford | G05B 23/0264 702/188 |
| 2011/0055118 | A1* | 3/2011 | Sanford | G05B 23/0264 705/500 |
| 2011/0130914 | A1 | 6/2011 | Shah et al. | |
| 2012/0245968 | A1* | 9/2012 | Beaulieu | G06Q 10/00 705/7.11 |

\* cited by examiner

ASSET MANAGEMENT IN A PROCESS CONTROL SYSTEM

BACKGROUND

A maintenance team is often responsible for keeping assets in an industrial process operational while an operations team is responsible for operating the assets. The maintenance and operations teams work on common assets and these two organizational functions need to work in very close collaboration to maximize the performance of the industrial assets. Unfortunately, this is not always the case. In many industrial organizations, the two teams do not collaborate and appear to compete with each other. This leads to suboptimal performance of industrial operations.

A primary reason behind the conflict between operations and maintenance is that the primary performance measures for each team tend to oppose one another. The primary performance measure for the maintenance team is typically asset availability, while the primary performance measure of operations is typically asset utilization. Asset availability means keeping the assets available to the operation by maximizing their "up time". Asset utilization means maximizing the throughput of the assets. One of the key drivers in maximizing asset availability of industrial asset is to not operate them aggressively. However, the operations team is often required to operate the assets as aggressively as possible to meet production requirements. This implies that asset availability and asset utilization have an inverse relationship and that the conflict between operations and maintenance is a direct consequence of this inverse relationship.

A system that automatically generates a performance measure of an industrial process in real time that takes into account the goals of both the maintenance and operations teams in the factory and automatically initiates process activities such as maintenance based on the performance measure would ensure that the close cooperation between the teams, improved productivity during up time, and minimized interruption from down time.

SUMMARY

Briefly, aspects of the present invention permit management or control of assets in a process control system. The system described herein calculates asset performance measures for a plurality of assets within a process control system and initiates process activities such as asset maintenance or operations throughput rates based on the calculated asset performance measures. The asset performance measures comprise data about the cost to run the assets, the cost of the raw materials being used by the assets, and the value of the products produced by the assets.

In one form, a system for improving production of a process control system is described. The system comprises a processor, sensors connected to one or more assets in the process control system, human-machine interfaces, and a storage memory storing both asset information and instructions for execution on the processor. The system receives process data via the sensors and determines an input cost of the one or more assets and an output value of the one or more assets. The system provides a net production value of the one or more assets based on the determined input cost and output value. The system stores the input cost, output value, and net production value on a storage memory and provides the input cost, output value, and net production value to a user via the human-machine interfaces. The system enables a user to change the behavior of the one or more assets in such a way that the net production value increases via the human-machine interfaces.

In another form, software instructions are stored on one or more tangible, non-transitory computer-readable media and are executable by a processor. In another form, a processor executable method is provided.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
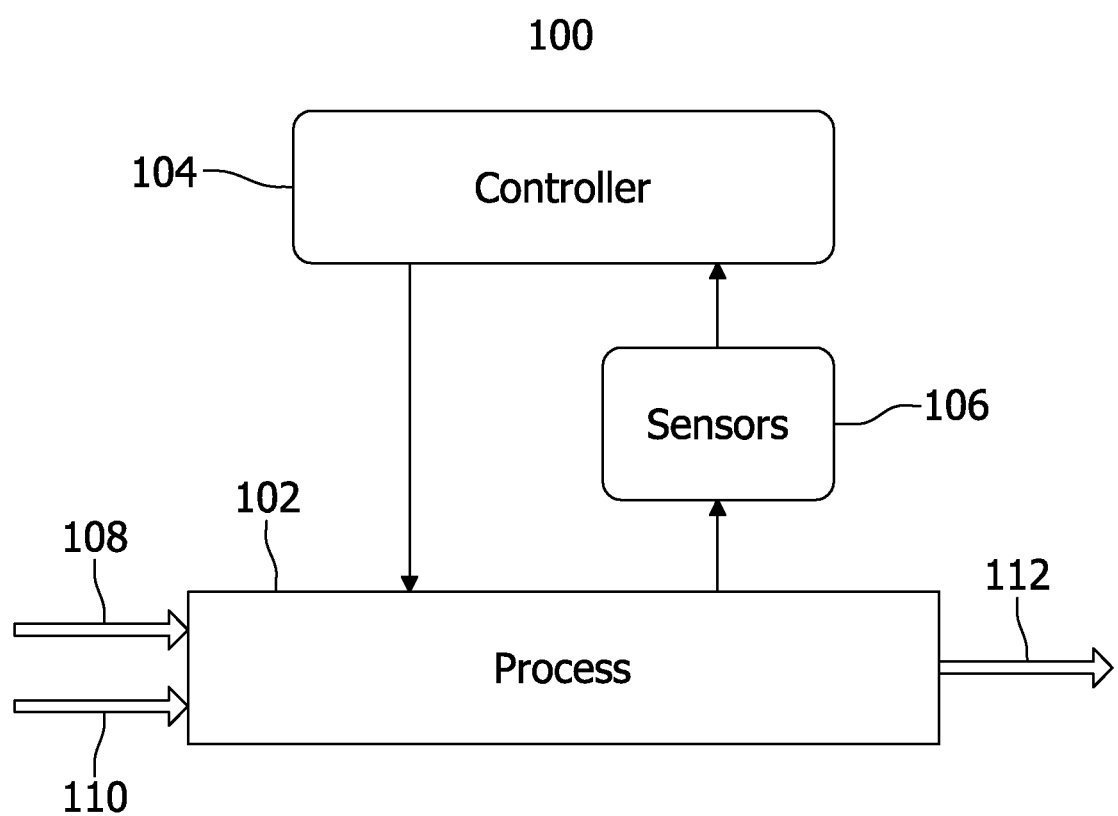
FIG. 1 is a block diagram illustrating a process control system embodying aspects of the invention.

FIG. 1 displays the basic structure of an exemplary process control system 100. In an embodiment, the process 102 is communicatively connected to the controller 104 and the sensors 106. The process has inputs 108 and 110 that comprise the necessary inputs for the process to create the output 112. In an embodiment, the input 108 includes energy for powering the process 102 and the input 110 includes physical or chemical raw materials for use in the process 102. The output 112 comprises physical or chemical products from the process or produced energy in the form of electricity or the like.

The controller 104 sends data to the process 102 in order to direct the operations of the process 102 according to the goals of the controller 104. The data sent comprises commands which operate various types of control elements in the process, such as valves, actuators, or the like. The sensors 106 monitor the process at various points and gather data from those points. The sensors 106 send the data gathered to the controller 104. Based on the gathered data, the controller 104 can then send additional commands to the process 102. In this way, the system forms a control feedback loop, where the controller 104 reacts to changes in the process 102 as observed by the sensors 106. Different actions carried out by the process 102 according to the commands of the controller 104 may result in the data being gathered by the sensors 106 changing, causing further adjustments by the controller 104 in response to those changes. By implementing this control feedback loop, the process 102 can be controlled by the controller 104 in an efficient manner.

Figure 2:
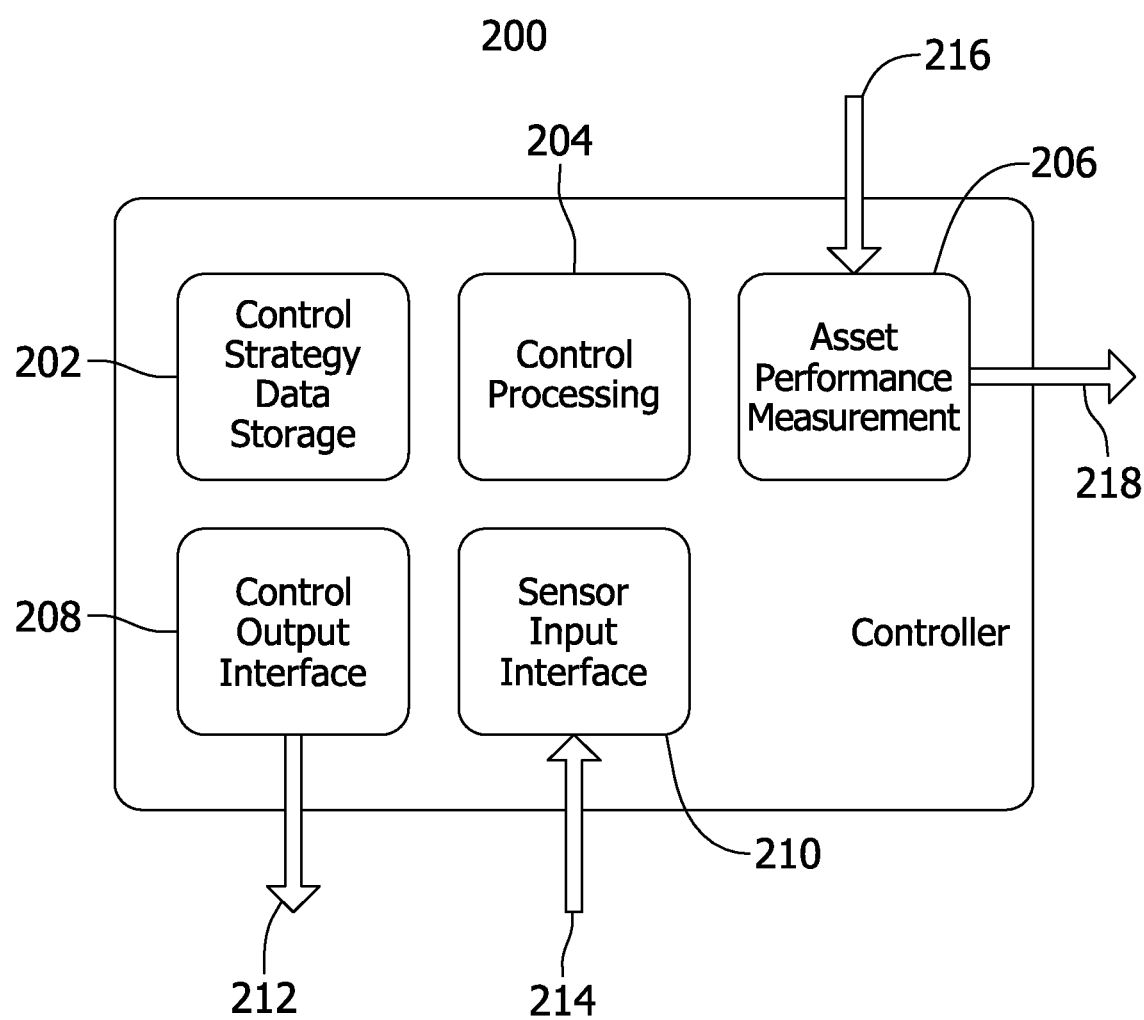
FIG. 2 is a block diagram of various modules that are present in an exemplary controller of the process control system of FIG. 1.

The diagram in FIG. 2 is an exemplary controller 200 comprising various modules for use in addition to (or as part of) or instead of controller 104. In operation, aspects of the invention relate to improving the productivity and efficiency of a process control system by monitoring costs and value produced and making changes to the process via the controller 200 that maximize the value produced in relation to the costs. The controller 200 comprises a control strategy data storage module 202, a control processing module 204, an asset performance measurement module 206, a control output interface module 208, and a sensor input interface 210. The control output interface 208 sends data 212 to a process such as process 102 in FIG. 1 and the sensor input interface 210 receives gathered sensor data 214 from sensors such as sensors 106 in FIG. 1.

The control strategy data storage module 202 stores the data gathered from the sensors as well as data comprising a control strategy for guiding a connected process. In an embodiment, the control strategy comprises goals such as set points and levels of elements of the connected process. The controller 200 sends command data 212 to the connected process which causes the connected process to change operations in such a way as to move toward the control strategy goals.

The control processing module 204 processes data received from the sensor input interface 210 into data that can be used to issue the correct commands 212 to the connected process. In an embodiment, sensor data 214 is in a raw form and the goals, set points, or levels of the control strategy do not comprise the same data as the sensor data 214. The control processing module 204 processes the sensor data 214 to render it useful for determining how to direct the connected process in order to achieve the control strategy goals.

In an embodiment, the controller 200 comprises an asset performance measurement module 206. The asset performance measurement module 206 measures the performance of an element, or asset, of the process as described further below. The asset performance measurement module 206 uses sensor data 214 as well as data 216 from outside sources, such as business data from business systems. Using the combination of data 214 and 216, the performance 218 of an asset of the process is determined and is sent from the controller to be stored and displayed in other portions of the process control system. The functionality of the asset performance measurement module 206 will be further described below.

Figure 3:
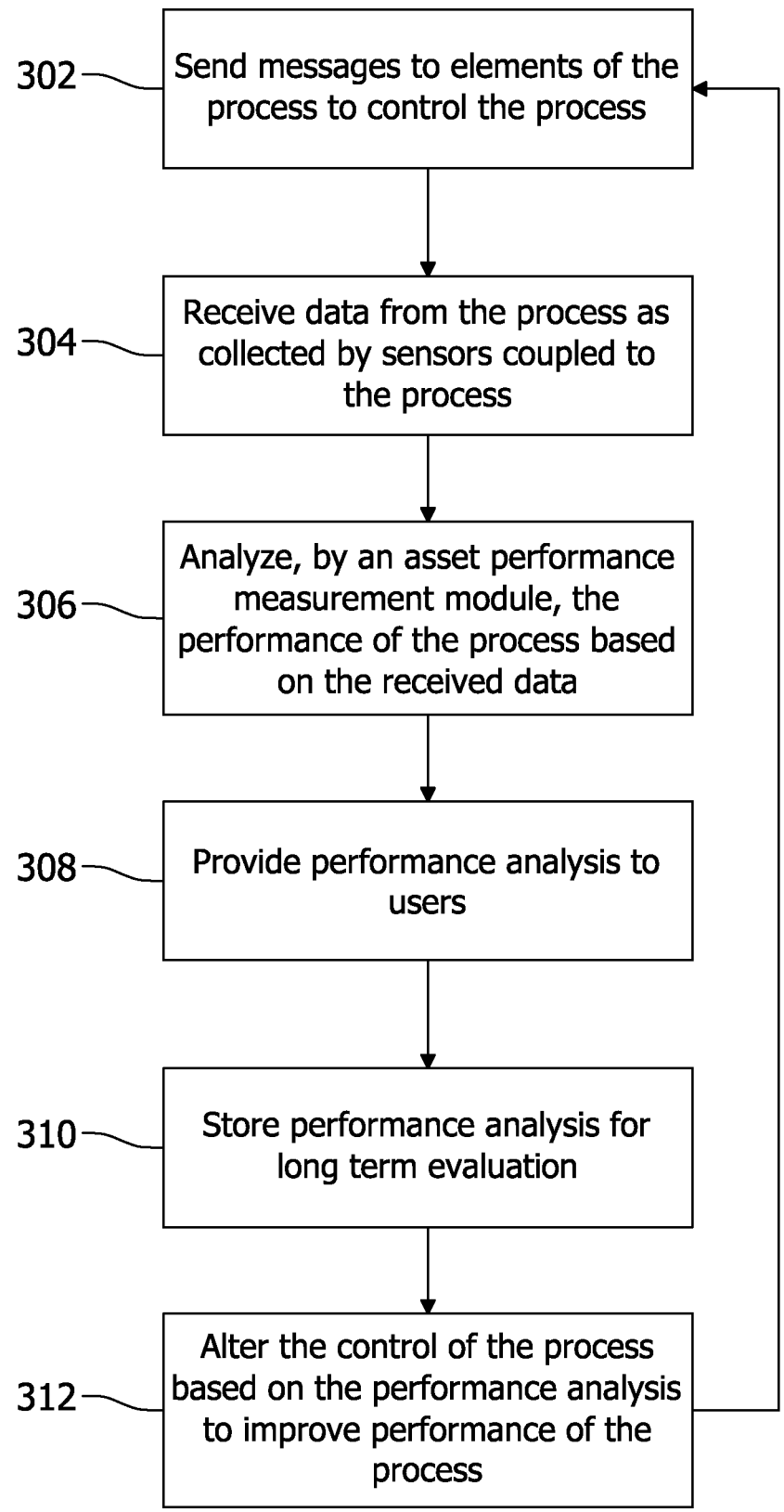
FIG. 3 is an exemplary flowchart illustrating a process of gathering data, calculating asset performance, and altering the system of FIG. 1 based on the calculated performance according to an embodiment of the invention.

FIG. 3 is a flowchart describing an exemplary of process controller of a process control system using asset performance measurement to improve the performance of the assets in which the process operates. The controller sends messages to the process to control the process (step 302). The controller also receives data from the process as collected by sensors coupled to the process (step 304). The controller includes an asset performance measurement module as in FIG. 2, and the controller uses the asset performance measurement module to analyze the performance of the process based on the received data (step 306). Upon completion of the analysis, the analysis is provided to users (step 308) via some form of user interface, such as a visual display. The performance analysis is also stored in a database for use in long term evaluation (step 310). The performance analysis may also be used by the process control system to alter the control of the process to improve the performance of the process (step 312). The changes made to the process may include actions such as altering the maintenance schedule for the asset automatically, or changing the operational set points, or the like.

Figure 4:
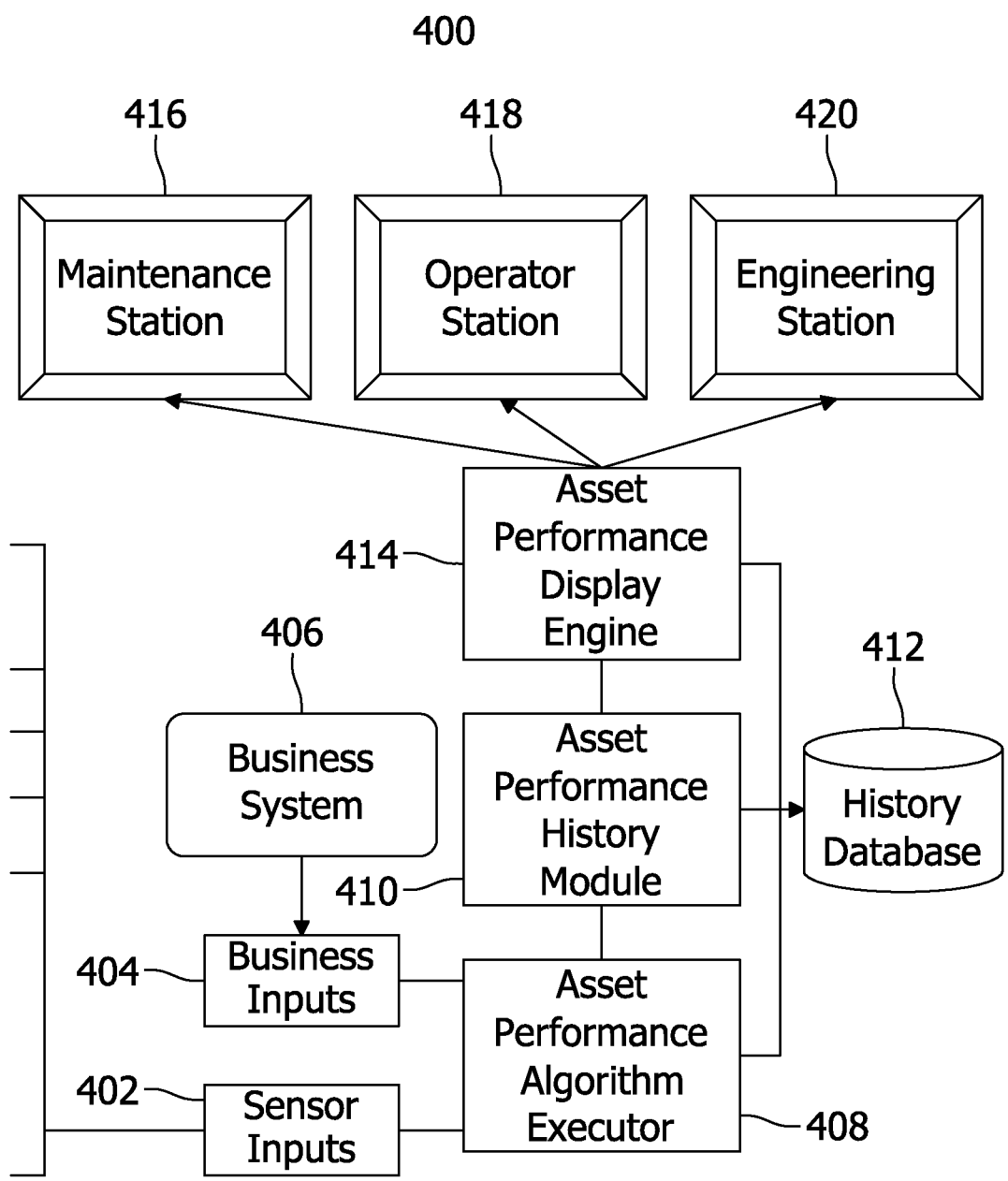
FIG. 4 is a block diagram illustrating various modules that make up an asset performance measurement system according to an embodiment of the invention.

FIG. 4 is an exemplary diagram of a way in which the described system may be structured. An Asset Performance Measurement System 400 comprises several different hardware and software modules working in concert to provide users with asset performance information and to respond to that asset performance information in order to improve the asset performance. The system 400 is connected to an "asset" of a process control system via sensor inputs 402. An asset may be any mechanical, chemical, electrical, biological or combined mechanism or set of mechanisms that is used to convert energy and materials into value added products or production. The sensor inputs 402 provide the system 400 with data gathered from the asset that can be used to determine asset performance. This data could include any data that can be gathered directly from the sensors or it could be information that is inferred from the directly gathered sensor data. The sensor data may be provided to the system 400 in real-time as it is gathered. In addition to the sensor inputs 402, business inputs 404 are also received by the system 400. The business inputs 404 include data from a business system 406, also known as an enterprise resource planning (ERP) system, indicating the costs per unit of consumption associated with the asset being monitored as well as the value of the output of the asset. The costs may include energy costs for operating the asset and materials costs for providing the asset with necessary raw materials to function. The business inputs 404 may be provided in real-time, or as close to real-time as is feasible, depending on the type of data being provided.

The sensor inputs 402 and the business inputs 404 are received by an asset performance algorithm executor module 408 which is a software module which may reside in a distributed control system (DCS). The asset performance algorithm executor module 408 is a software module that may be stored on a storage memory device and may be executed by the processors of the DCS. The executor module 408 executes asset performance models in real-time according to the received sensor inputs 402 and business inputs 404. The models may include algorithms for calculating costs of operation of the asset, actual values of the output of the asset, potential values of the output of the asset, real-time performance of the asset, and opportunity costs associated with operating the asset. The function of these algorithms is described in detail below.

The real-time results calculated by the asset performance algorithm executor module 408 are transferred to an asset performance history module 410, which will store those results in a history database 412 for later access and analysis. Storing the results over time enables the system to do historical analysis on past data and provides a user with the ability to find patterns in the operation of the asset. These patterns may be exploited to improve the efficiency and maintained state of the asset. In addition to being stored by the asset performance history module 410, the results from the executor module 408 may also be transferred to an asset performance display engine 414, which may be connected to a variety of different human-machine interfaces, such as a maintenance station 416, an operator station 418, and an engineering station 420. The stations 416, 418, and 420 may each be a separate hardware interface or they may each be a software interface that may be accessed on a single device. The display engine 414 may provide different information and a different appearance to each of the stations 416, 418, and 420 based on what the users of the stations may need. The maintenance station 416 may provide information about the maintenance schedule of the asset or prior issues that have been fixed on the asset recently. The operator station 418 may provide real-time information as to the current operation of the asset. The engineering station 420 may provide long-term trend information based on the gathered and stored data in the history database 412 that enables an engineer to view patterns that indicate inefficiencies in the operation of the asset over time. The stations 416, 418, and 420 may be directly connected to the DCS through the display engine 414, or they may be located elsewhere and receive information via a network connection. The stations 416, 418, and 420 may provide the users an opportunity to more closely collaborate in an effort to improve productivity of the asset.

The key to collaboration is relegating asset availability and asset utilization to secondary measures and defining a common primary performance measure between operations and maintenance that will drive both collaboration and the performance plant management requires. The ultimate objective for most industrial operations is to maximize the business performance of the operation so the common performance measure should be based on the contribution to business performance from each asset or asset set. This common business performance-based performance measure is referred to as asset performance.

Figure 5:
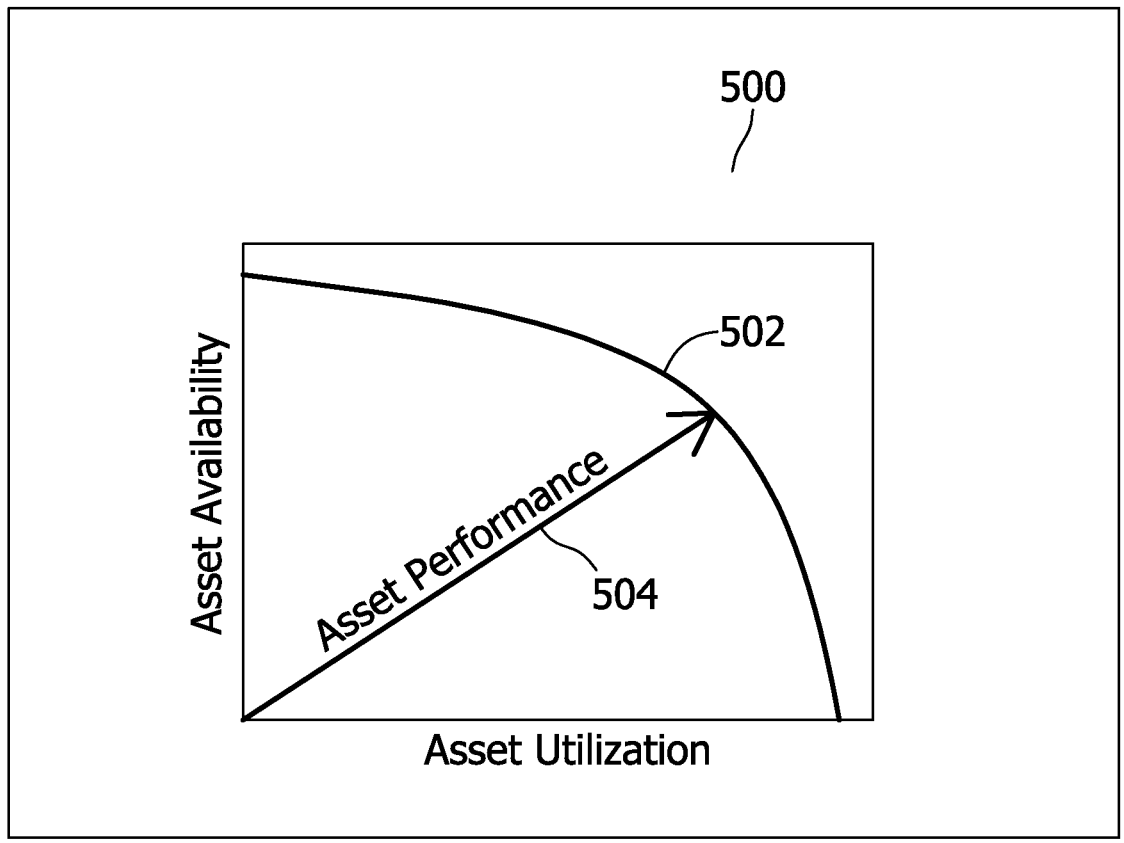
FIG. 5 is an exemplary graph of the relationship between asset availability and asset utilization according to an embodiment of the invention.

FIG. 5 displays a simple graph 500 describing the relationship between asset availability on the vertical axis and asset utilization on the horizontal axis. In many cases, extended or high level use of an asset causes wear and tear on parts of the asset that may harm productivity and may require maintenance. Maintenance requires the asset to sit idle for a certain amount of time, rendering it unavailable to the operation. The graph depicts a curve 502 representing that, as an asset is used more and more, the effective availability of the asset slowly falls at first. Eventually, the curve turns downward steeply, representing a large loss in productivity of the asset. An asset performance vector 504 represents a point along the curve that is the optimal point for operating the asset from a business performance perspective. The system in FIG. 4 is capable of monitoring the performance of an asset in order to predict how to set up the asset performance vector 504 to result in maximized productivity and minimized but efficiently spaced maintenance down time.

The mechanism presented herein is designed to provide a common definition and approach for developing the asset performance vector for complex industrial assets and asset sets. With this asset performance measure as the guiding performance measure for both the operations and maintenance teams, the level of collaboration between the teams is expected to increase, leading to more effective problem solving and cooperation which should result in improved performance across industrial operations.

The following terms are defined and used in this application. Asset Performance is the business performance of the asset relative to its potential business performance. Asset Value is the business contribution of an asset or asset set. Energy Consumption Input Vector is the vector of energy quantity inputs into an asset or asset set. An industrial asset is a mechanical, chemical, electrical, biological or combined mechanism or set of mechanisms that is used to convert energy and materials into value added products or production. Production value is the current market value of the products or production produced from an asset or asset set. A value point is any output from an asset or asset set that has inherent market value.

Figure 6:
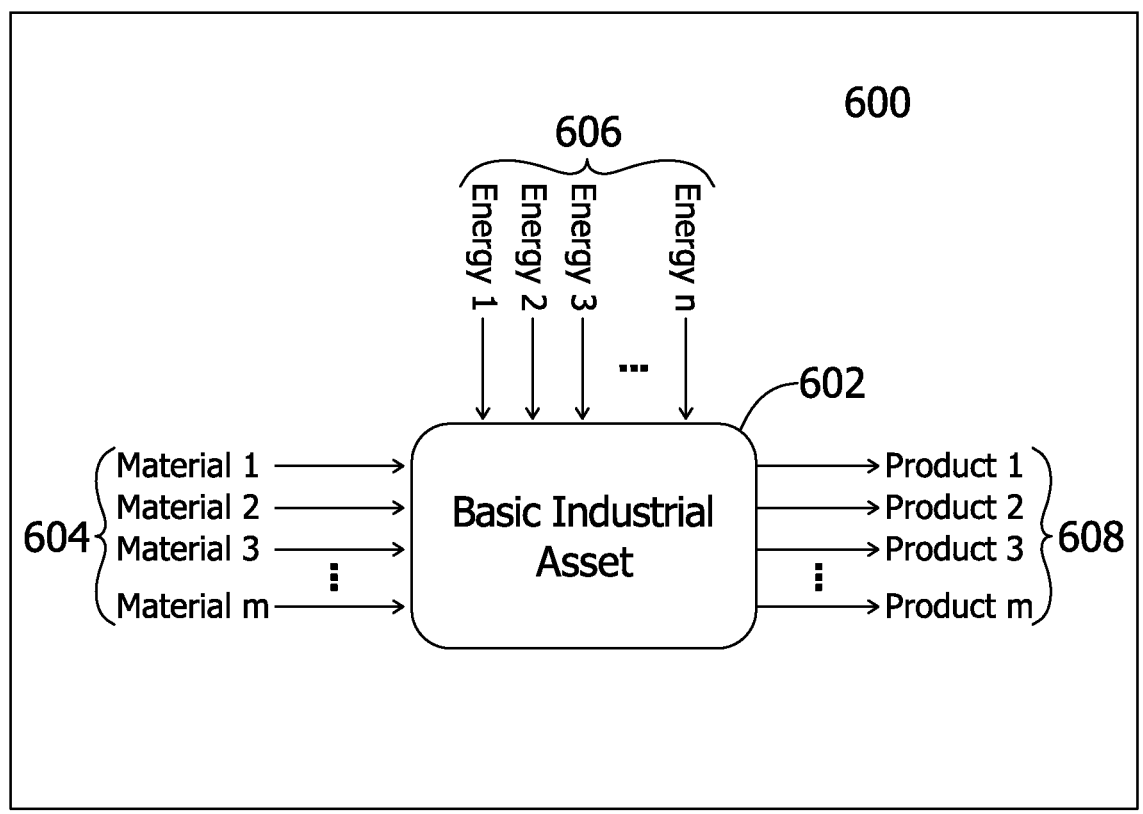
FIG. 6 is an exemplary diagram of a basic industrial asset according to an embodiment of the invention.

FIG. 6 represents a general industrial asset module 600. The asset 602 may be any sort of device or mechanism used in an industrial process setting that converts raw materials and energy into products or production. The asset 602 may receive one or more input materials 604 and one or more input energy sources 606. Using the materials 604 and energy 606, the asset 602 executes the operation for which it was built, resulting in one or more products 608.

Figure 7:
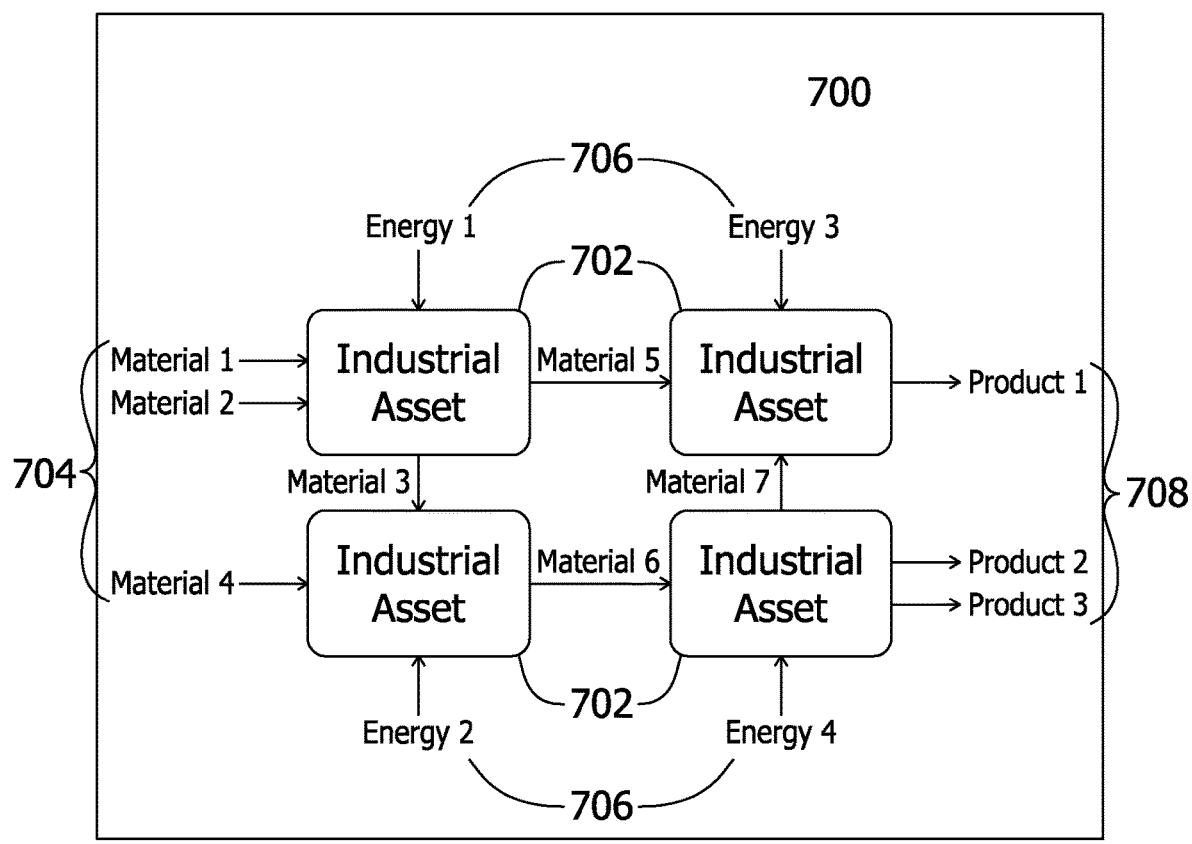
FIG. 7 is an exemplary diagram of a set of industrial assets according to an embodiment of the invention.

In FIG. 7, an industrial asset set 700 is an integrated collection of industrial assets 702 that together exhibit the same operating characteristics as a single asset and can be considered as a single value-adding asset. The industrial assets 702 may receive one or more input materials 704 and one or more input energy sources 706. The industrial assets 702 in the asset set 700 work together to produce one or more products 708.

Figure 8:
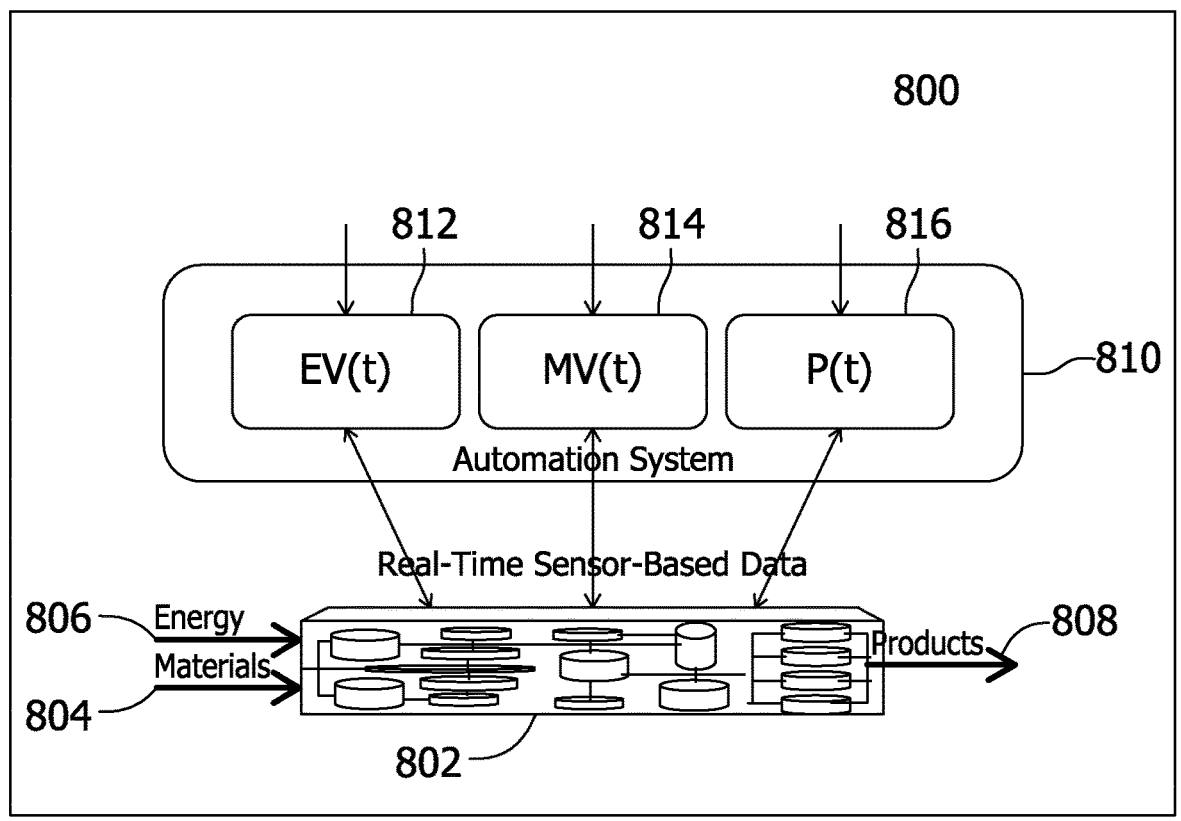
FIG. 8 is an exemplary diagram of a system for calculating input costs and output value according to an embodiment of the invention.

In FIG. 8, a combined system 800 comprises an asset or asset set 802 which receives material input 804 and energy input 806 and produces products 808. An asset performance measurement system 810 receives real-time sensor-based data from the asset 802. The system 810 calculates a current cost of energy using an energy algorithm module 812, the current cost of materials using a materials algorithm module 814, and the current value of the products using a product algorithm module 816. The primary objective is to provide a consistent business value approach to measuring the asset performance of every value generating asset or asset set in an industrial operation. The asset performance (AP) of an asset should be a function of the energy consumed over any time period multiplied by the cost of that energy, the material consumed over the time period multiplied by the cost of the materials and the production value produced over the time period. Since there may be multiple energy sources and materials into the asset or asset set and since the asset or asset set may produce multiple products, all of these variables must be considered. Therefore:

The energy value (E) determined by the energy algorithm module 812 is determined by the equation:

$$E(t) = \sum_{i=1}^{a} ec_i(t) \, {}^*ep_i(t)$$

wherein: $ec_i$ is energy consumed over the time period, $ep_i$ is the price of the energy over the time frame, and a is the number of energy sources to the asset or asset set. E(t) can be directly modeled in a real-time automation system by connecting to sensor based measurements that enable the amount of energy consumed in the asset or asset set to be either directly measured or inferred, and retrieving the cost of each energy source from either the business system or energy supplier.

The material value (M) over the period of time (t) determined by the material algorithm module 814 is determined by the equation:

$$M(t) = \sum_{i=1}^{b} mc_i(t) * mp_i(t)$$

wherein: $mc_i$ is amount of material consumed over the time period, $mp_i$ is the price of the material consumed over the time period, and b is the number of materials to the asset or asset set. M(t) can be directly modeled in a real-time automation system by connecting to sensor based measurements that enable the amount of material consumed in the asset or asset set to be either directly measured or inferred, and retrieving the cost of each material from either the business system or energy supplier.

The production value (P) over the time period (t) determined by the product algorithm module 816 is determined by the equation:

$$P(t) = \sum_{i=1}^{c} p_i(t) * pv_i(t)$$

wherein: $p_i$ is amount of product produced over the time period, $pv_i$ is the market value of the product produced, and c is the number of products produced by the asset or asset set. P(t) can be directly modeled in a real-time automation system by connecting to sensor based measurements that enable the amount of each type of production produced through the asset or asset set, and retrieving the market price of each product produced from either the business system or market pricing source.

Figure 9:
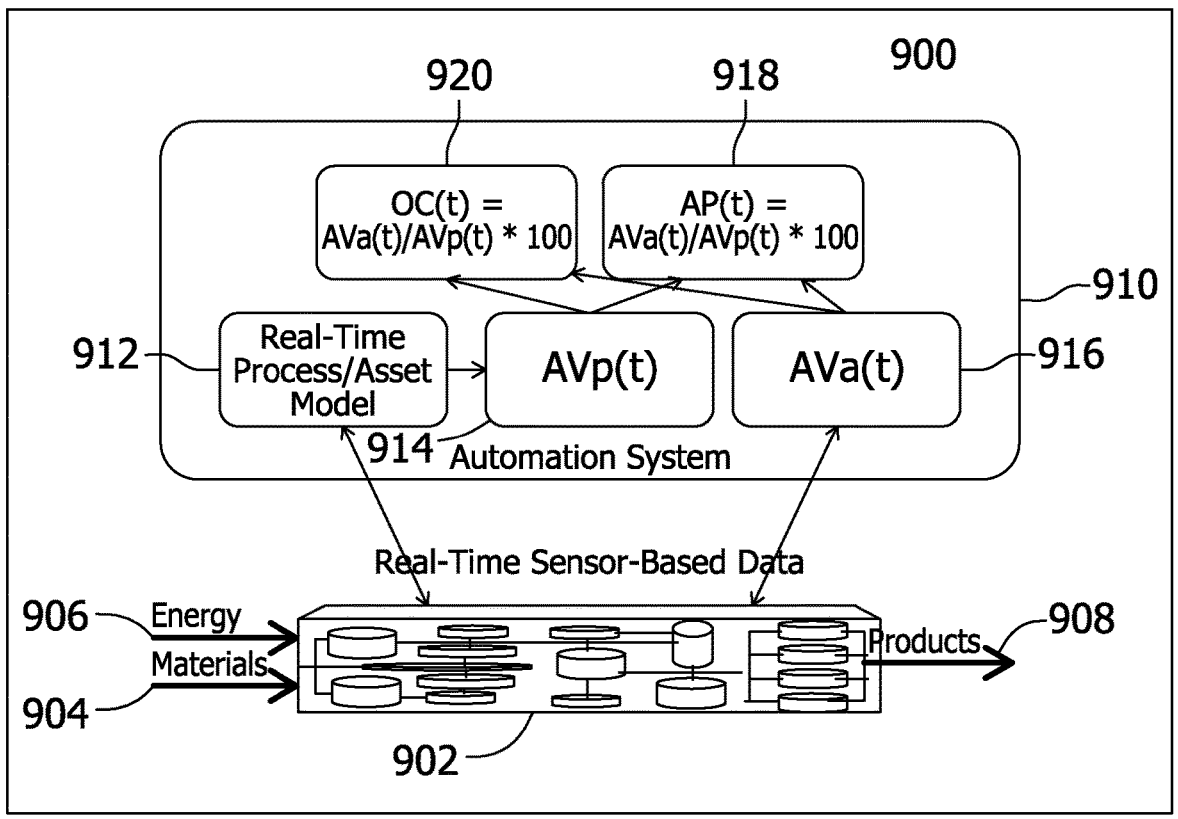
FIG. 9 is an exemplary diagram of a system for calculating opportunity cost and asset performance according to an embodiment of the invention.

In FIG. 9, the performance measurement system 910 calculates further performance metrics using the results of the equations from modules 812, 814, and 816 in FIG. 8. The combined system 900 comprises an asset or asset set 902 which receives material input 904 and energy input 906 and produces products 908. A real-time asset model 912 receives sensor data from the asset 902 and uses the sensor data to model the business performance of the asset. Monitoring the ongoing business performance of the asset can help determine best potential behavior based on the gathered sensor data. The asset model 912 is used to calculate the potential asset value 914 of the asset. Additionally, the sensor data is received by an actual asset value module, which calculates the actual asset value 916 in real-time. The real-time asset value (AV) produced by the asset or asset set is the real time business value created over any time period (t) from the asset set. It is important to note that AV is not the overall profitability from the asset or asset set. Rather is represents the components of profitability that vary with high frequency. The equation for AV is:

$$AV(t)=P(t)-(E(t)+M(t))$$

The production value P(t), energy value E(t) and material value M(t) should be relatively constant over the time period (t). This required that t be set to reflect the dynamics of the business. Since the dynamics of each value metric are a function of both the process dynamics (consumption or production rates), and the financial dynamics (cost or market value), and since both process dynamics are real time by definition, and financial dynamics are getting faster, t must be set to a short timeframe for accuracy.

Implicit in the asset performance measurement structure presented herein is that the output of the asset or asset set under consideration has actual market value. This is not always the case since some intermediates in manufacturing and production processes cannot really be sold in the open market. For decades engineers have been working to assign pseudo value to these intermediates using sophisticated mathematical analyses. From a pure business perspective this approach to establishing pseudo values in invalid. Therefore, the basis of this asset performance measurement system is to only consider asset outputs that have actual market value. It may be necessary to group base assets into asset sets to utilize this performance measurement system correctly. The grouping into asset sets should be done to analyze the assets to the value point level, but it also can be done to get a broader picture of the value produced by assets, and may actually be done to the plant level or even the multiple plant level.

The Asset Value (AV(t)) metric provides a basis for understanding the current business performance of each asset or asset set. The key is to compare the current asset value with what the asset value would be if the asset were operating to its potential. This can be accomplished through the use of real-time process and asset models 912 of the operation and its assets. Therefore, using a model 912 of the ideal operation of the process and its assets tied into the automation system to get the current settings (set points etc.) for the operation and the real-time process sensor data of the live process, the potential asset value 914 ($AV_p(t)$) over the time period t can be calculated using equipment ratings or best performance operations levels.

With both the actual asset value and the potential asset value, the asset performance 918 (AP(t)) of the asset or asset set can be determine by calculating:

$$AP(t)=(AV_a(t)/AV_p(t))*100$$

This statistic provides a percentage that represents how the asset is operating from a business perspective. This statistic still does not convey the true business "pain" associated with underperformance of the asset in business potential terms. This "pain" represents the opportunity cost 920 (OC) to the operation from underperforming assets or asset sets. This can be accomplished by the equation:

$$OC(T) = \sum_{t=1}^{T} AV_P(t) - AV_a(t)$$

wherein T is the overall time period for the analysis and t represents the individual time segments at which the AV(t) calculation is done across T.

Figure 10:
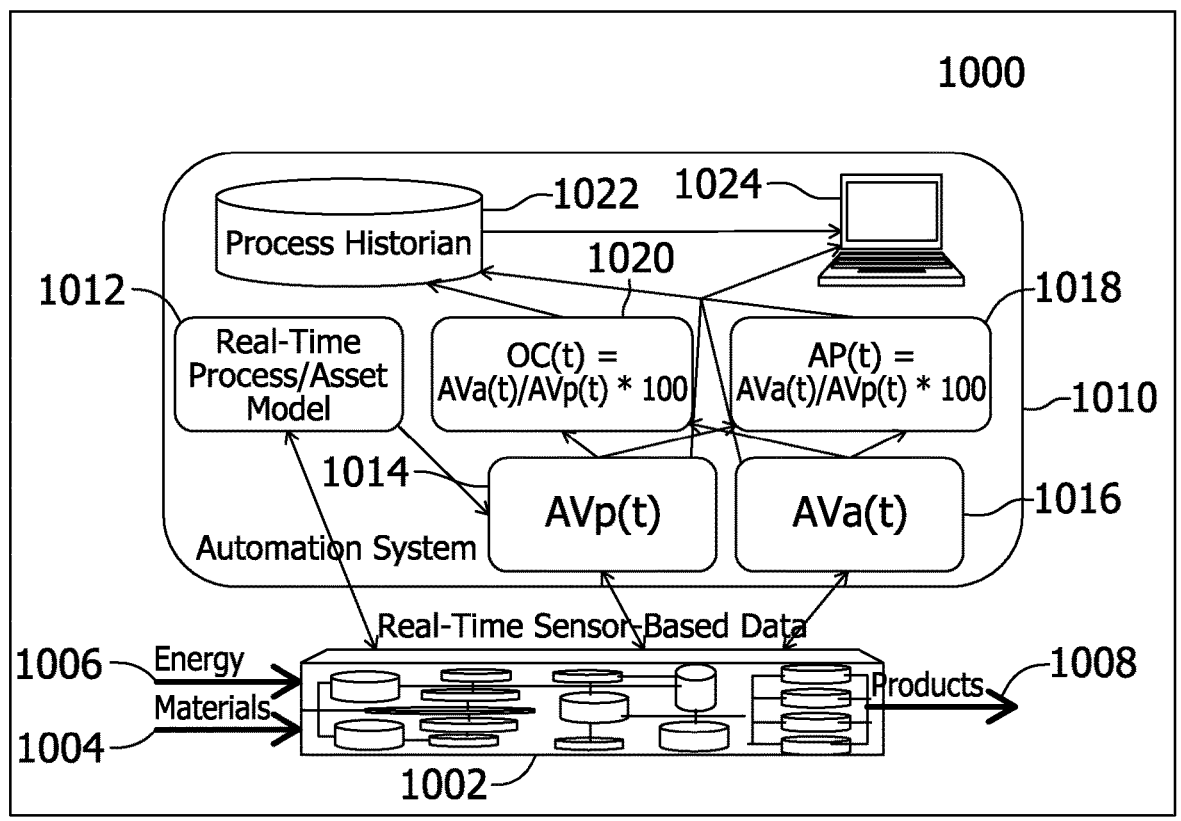
FIG. 10 is an exemplary diagram of the system of FIG. 9 including storage of the calculated values in a Historian database.

The overall structure of this asset performance measurement mechanism is shown in FIG. 10. This diagram shows a structure for the mechanism for the assets and asset sets within the domain of the automation system. This is the performance measurement system 1000 for the assets 1002 and does not indicate how the OC(t) or AV(t) metrics may be used in decision making. The asset or asset set 1002 receives material input 1004 and energy input 1006 and produces products 1008. The asset 1002 is connected by sensors to an automation system 1010 of the performance measurement system 1000. A real-time asset model 1012 receives sensor data from the asset 1002 and uses the sensor data to model the asset and determine best potential behavior based on the gathered sensor data. The asset model 1012 is used to calculate the potential asset value 1014 of the asset. Additionally, the sensor data is received by an actual asset value module, which calculates the actual asset value 1016 in real-time. The actual asset value 1016 and the potential asset value 1014 may be used by the automation system 1010 to calculate the asset performance 1018 and the opportunity cost value 1020. All of these values can be stored in a process historian 1022 and then accessed later on an interface 1024 for analysis and decision making with respect to actions taken for the asset 1002.

With the ability to measure asset value (AV(t)), asset performance (AP(t)) and opportunity cost (OC(t)) for each value generating asset or asset set in an operation, both operations, maintenance and engineering will have new tools for evaluation and decision making associated with the operational assets of the organization. They will be able to view the assets from a business value perspective in order to make good business decisions for the operation based on asset impact.

One example of how these metric may be employed for intelligent decision making is to project the current OC(t) across different time frames to get an economic measure of the lost opportunity due to underperforming assets to determine maintenance timing. If, for example, the mean time to perform the required maintenance on an asset set is t1, and the cost of the required maintenance is c1, then maintenance can be automatically triggered when the projected OC(t1) exceeds c1. This may be automatically imposed through the utilization of a real-time workflow engine operating in the automation system. Other relationships may be identified that are better suited to both the operational and business characteristics of the plant.

The premise that led to the development of a more business oriented asset performance measurement system was that such a system would encourage both better business-based decision-making in industrial operations while simultaneously encouraging operations and maintenance to collaborate to gain superior results. FIG. 5 shows vector 504 AP(t) as the convergence metric for operations and maintenance. The vector 504 may also work from a more balanced set of metrics, AP(t), OC(t) and AV(T) as the convergence information.

These asset performance measures may be utilized by maintenance, operations and engineering in order to have positive business impact on industrial operations. Industrial assets tend to degrade with time and utilization and since operational parameters also tend to change, it is critically important to analyze both the instantaneous values and the historical performance. With usage and experience with each asset and asset set it can be expected that asset performance dynamics and relationships will be discovered. These relationships may be used to develop automatic control responses to asset performance over time.

As an example, a crude unit in an oil refinery has crude oil as its primary material input. The crude is heated in a furnace to the point of evaporation then is moved into a distillation column where the vaporized crude ascends though the column. As the vaporized crude cools to the point at which it reaches temperature limits that cause certain components of the crude to liquefy, the liquefied components are captured in the column and flow out as purified components such as in as gasoline, kerosene, diesel oil and fuel oil. Gas flows through the top of the column and heavier residuals flow out the bottom for later processing (see diagram below). Each of the streams out of the crude unit has fundamental market value. This unit provides an interesting if complex unit to understand the concepts associated with the mechanism for measuring the business impact of industrial assets.

Figure 11:
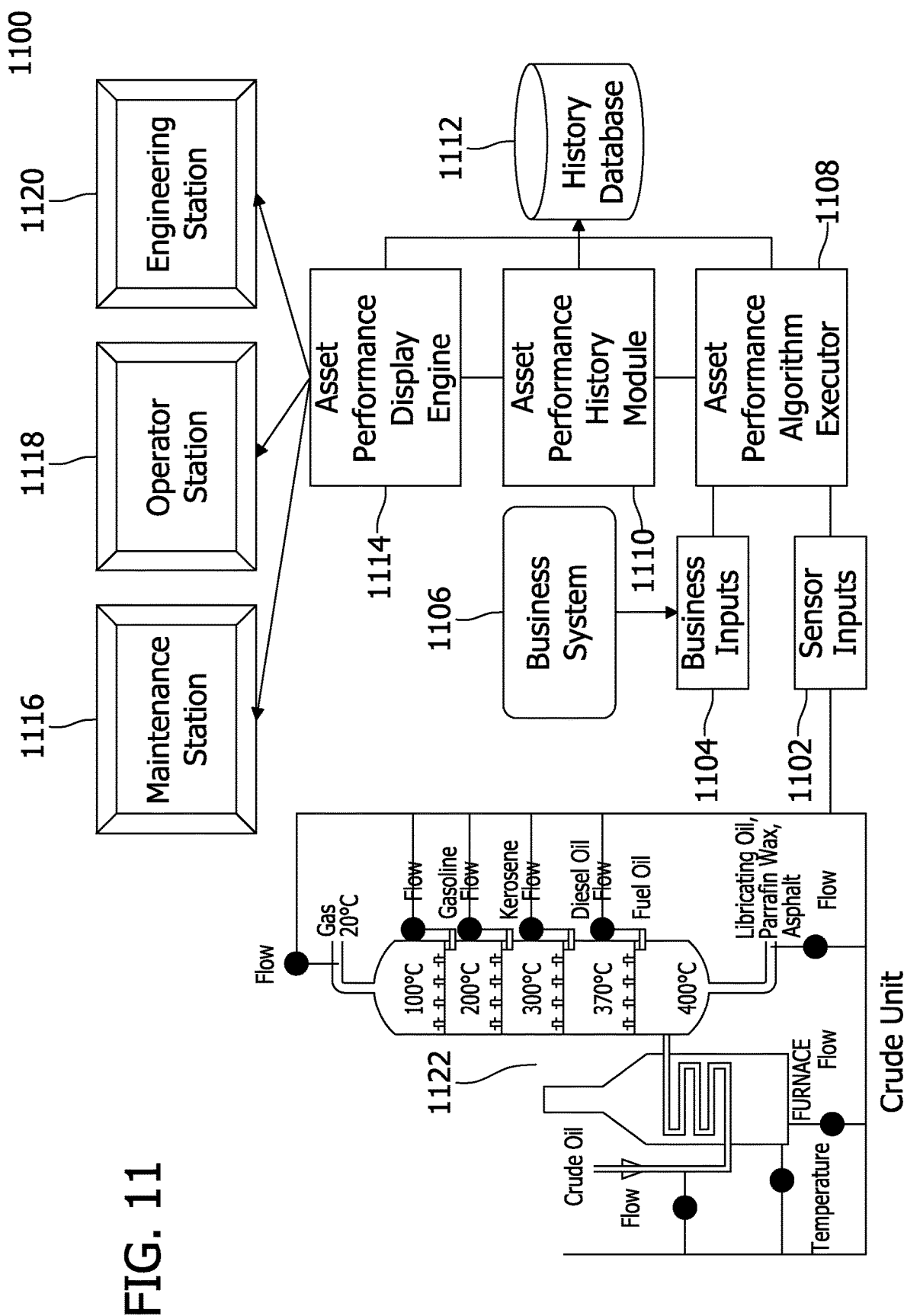
FIG. 11 is a diagram of the asset performance measurement system of FIG. 4 connected to a Crude Unit.

In FIG. 11, a distributed control system 1100 is installed in the refinery and part of the system responsibility is the control of the Crude Unit 822. An enterprise resource planning (ERP) system 1106 is installed and the relevant business metrics for the asset performance calculations are in the ERP database and accessible by the asset performance measurement system via business inputs 1104. Process instrumentation is installed in the plant and connected to the DCS by sensor inputs 1102 in order to enable the real-time models or asset performance.

The basic Asset Performance Measurement system 1100 for the Crude Unit 822 contains instrumentation for measuring all of the key process measures around the Crude Unit (flows, temperatures etc.) connected via sensor inputs 1102 in real-time into the distributed control system (DCS) as shown in the diagram. Also connected into the DCS is the enterprise resource planning (ERP) system 1106 which will provide all relevant business values via business inputs 1104 (for instance, fuel cost, material cost, gas pricing, gasoline pricing, kerosene pricing, diesel oil, fuel oil pricing, and residual value) as often as those values change in the marketplace or at the level of transfer pricing established by the company. These values will be available to the Asset Performance Measurement Algorithm Executor 1108 in the controllers of the DCS. The Asset Performance Measurement Algorithm Executor 1108 is configured to execute the asset performance models in real-time that are sourced by the sensor-based data and the business information from the ERP system. The real-time values calculated in the Asset Performance Algorithm Executor 1108 are transferred to the Asset Performance History module 1110 in real-time and the Asset Performance History Module 1110 stores the measures in a historical database 1112. The Asset Performance Display Engine 1114, again typically within the DCS is pre-configured with dashboard displays for Maintenance professionals that are displayed on the Maintenance Station 1116, displays for operators that are displayed on the Operator Stations 1118, and displays for engineers that are displayed on the Engineering Stations 1120. This real-time decision support information will enable all three groups (Maintenance, Operators and Engineers) to perform their actions and activities in a more effective manner by providing real-time feedback of the impact of their actions, but it will also encourage collaboration and cooperation because these three teams will be working to common asset performance measures.

An exemplary snapshot of the asset performance of the Crude Unit over an hour is provided below. In actual operation, these measures may be continually calculated and the asset performance dashboard displays continually updated so the Maintenance, Operations, and Engineering personnel may continually monitor the performance and make ongoing decisions on how the asset performance might be improved. For the purposes of this example, a simplified model will be utilized to demonstrate the concept of the system. An actual implementation may be more rigorous, complex, and incorporate many more energy and material sources.

The material input to the exemplary process is crude oil for which it is assumed a molecular model has previously been developed to provide an understanding of the optimal product mix that could be generated. The primary energy source is the fuel used in the furnace to heat the crude to vaporization. The product outputs are gas, gasoline, kerosene, diesel oil, fuel oil and residuals. The time period used for this example will be one hour of run time. The costs and production values are not necessarily representative of any actual refinery or for any particular time period.

Over the hour it is assumed that the price paid for the fuel used to heat the crude oil in the furnace changes every 15 minutes. The energy value is:

$$E(t) = \sum_{i=1}^{4} ec_i(t) * ep_i(t)$$

For each 15 minute period in the hour assume the following costs and consumptions:

TABLE 1

Energy Consumption Cost

| Cost/m³ | Consumption (m³) | Cost/Period |
|---|---|---|
| $15 | 60,000 | $ 90,000 |
| $18 | 75,000 | $135,000 |
| $13 | 62,000 | $ 80,600 |
| $16 | 80,000 | $128,000 |
| Total Cost | | $433,600 |

Assuming the material cost varies at most frequently every 10 minutes across the hour, the material cost profile is based on the following model.

$$M(t) = \sum_{i=1}^{6} mc_i(t) * mp_i(t)$$

For each 10 minute period in the hour assume the following costs and consumptions:

TABLE 2

Oil Consumption Cost

| Cost/Barrel | Consumption (barrels) | Cost/Period |
|---|---|---|
| $100 | 950 | $ 95,000 |
| $100 | 1000 | $100,000 |
| $110 | 960 | $105,600 |
| $110 | 900 | $ 99,000 |
| $105 | 1020 | $107,100 |
| $105 | 1000 | $105,000 |
| Total Cost | | $611,700 |

This would mean that the total cost of production for the hour under consideration was $1,045,300.

The production value would need to be calculated for each product produced utilizing the following model:

$$P(t) = \sum_{i=1}^{n} p_i(t) * pv_i(t)$$

It is assumed that the price variability for each product made can change every 15 minutes providing the following values:

TABLE 3

Production Value of Gas

| Price | Production | Value/Period |
|---|---|---|
| $15 | 3000 | $ 45,000 |
| $18 | 3200 | $ 57,600 |
| $13 | 2800 | $ 36,400 |
| $16 | 3500 | $ 56,000 |
| Total Production Value | | $195,000 |

TABLE 4

Production Value of Gasoline

| Price | Production | Value/Period |
|---|---|---|
| $2.50 | 80,000 | $200,000 |
| $2.50 | 85,000 | $212,500 |
| $2.50 | 72,000 | $180,000 |
| $2.50 | 75,000 | $187,500 |
| Total Production Value | | $780,000 |

TABLE 5

Production Value of Kerosene

| Price | Production | Value/Period |
|---|---|---|
| $1.80 | 40,000 | $ 72,000 |
| $1.80 | 35,000 | $ 63,500 |
| $1.60 | 35,000 | $ 56,000 |
| $1.60 | 39,000 | $ 62,400 |
| Total Production Value | | $253,400 |

TABLE 6

Production Value of Diesel

| Price | Production | Value/Period |
|---|---|---|
| $3.00 | 10,000 | $ 30,000 |
| $3.00 | 9,000 | $ 27,000 |
| $3.10 | 11,000 | $ 34,100 |
| $3.10 | 12,000 | $ 37,200 |
| Total Production Value | | $128,300 |

TABLE 7

Production Value of Fuel Oil

| Price | Production | Value/Period |
|---|---|---|
| $2.00 | 4,000 | $ 8,000 |
| $2.20 | 3,800 | $ 8,360 |
| $2.20 | 4,200 | $ 9,240 |
| $2.30 | 3,900 | $ 8,970 |
| Total Production Value | | $34,570 |

TABLE 8

Production Value of Residuals

| Price | Production | Value/Period |
|---|---|---|
| $1.00 | 3,000 | $ 3,000 |
| $1.00 | 3,200 | $ 3,200 |
| $1.00 | 2,800 | $ 2,800 |
| $1.00 | 2,900 | $ 2,900 |
| Total Production Value | | $11,000 |

Taken together this would provide a total production value for the crude unit during the hour of $1,403,170.

The Asset Value for the Crude Unit over the hour is the total production value less the total cost, or $1,403,107−$1,045,300, resulting in an asset value of $357,870.

The next step is to determine the potential asset value for the Crude Unit using the same crude composition and same energy and material cost as input to the process. The assumption is that energy and material input are not constraints on the production. Since the same energy and material costs will be used for the potential asset value, only the potential production values need be calculated. This is done for each component of production (gas, gasoline, kerosene, diesel, fuel oil and residuals) using the same market prices but with maximum potential production as follows.

TABLE 9

Potential Production Value of Gas

| Price | Production | Value/Period |
|---|---|---|
| $15 | 3500 | $ 52,500 |
| $18 | 3500 | $ 63,000 |
| $13 | 3500 | $ 45,500 |
| $16 | 3500 | $ 56,000 |
| Total Production Value | | $217,000 |

TABLE 10

Potential Production Value of Gasoline

| Price | Production | Value/Period |
|---|---|---|
| $2.50 | 85,000 | $212,500 |
| $2.50 | 85,000 | $212,500 |
| $2.50 | 85,000 | $212,500 |
| $2.50 | 85,000 | $212,500 |
| Total Production Value | | $850,000 |

TABLE 11

Potential Production Value of Kerosene

| Price | Production | Value/Period |
|---|---|---|
| $1.80 | 40,000 | $ 72,000 |
| $1.80 | 40,000 | $ 72,000 |
| $1.60 | 40,000 | $ 64,000 |
| $1.60 | 40,000 | $ 64,000 |
| Total Production Value | | $272,000 |

TABLE 12

Potential Production Value of Diesel

| Price | Production | Value/Period |
|---|---|---|
| $3.00 | 12,000 | $ 36,000 |
| $3.00 | 12,000 | $ 36,000 |
| $3.10 | 12,000 | $ 37,200 |
| $3.10 | 12,000 | $ 37,200 |
| Total Production Value | | $146,000 |

TABLE 13

Potential Production Value of Fuel Oil

| Price | Production | Value/Period |
|---|---|---|
| $2.00 | 4,200 | $ 8,400 |
| $2.20 | 4,200 | $ 9,240 |
| $2.20 | 4,200 | $ 9,240 |
| $2.30 | 4,200 | $ 9,660 |
| Total Production Value | | $36,540 |

TABLE 14

Potential Production Value of Residuals

| Price | Production | Value/Period |
|---|---|---|
| $1.00 | 3,200 | $ 3,200 |
| $1.00 | 3,200 | $ 3,200 |
| $1.00 | 3,200 | $ 3,200 |
| $1.00 | 3,200 | $ 3,200 |
| Total Production Value | | $12,800 |

Taken together this would provide a total potential production value for the crude unit during the hour of $1,534,340.

The potential Asset Value for the Crude Unit over the hour is the total potential production value less the total cost or $1,534,340−$1,045,300, which is $489,040. The Opportunity Cost for the Crude Unit over the hour is given by the potential Asset Value less the actual Asset Value, or $489,040−$357,870, which is $131,170. This represents the incremental value that the operation may have generated had it been operating to maximum potential.

The Asset Performance of the Crude Unit over the hour is the ratio of the actual Asset Value over the potential Asset value, or 357,870/489,040, which is 0.74 or 74% in this case. This represents the percentage to potential for the Crude Unit.

Finally, the Asset Performance vector for the hour can be characterized by AP(T), OC(T), and AV(T) which is (74%, $131,170, $489,040). The operations personnel may make changes to the process to increase the 74%, decrease the $131,170, and increase the 489.040 going forward. This will be accomplished by providing real-time feedback to maintenance, operations and engineering on these three statistics and the history of each. This will allow each of these groups to perform their duties in a manner that will maximize the asset performance of the Crude Unit.

Maintenance teams may monitor the asset performance and determine when the opportunity cost increases to the point at which normal maintenance needs to be carried out on the unit. This can be done according to the economic value provided by the maintenance as compared with the lost opportunity created by delaying the maintenance. This enables preventive maintenance schedules to be developed by economic value rather than the traditional periodic schedule used in most industrial operations.

Operations may utilize the asset performance percentage to determine the impact of their actions on performance of the Crude Unit. If they can normally operate at an 85% level and are now having difficulty going over 74% they will know that there is a critical root cause or root causes that are reducing value in the operation. After adjusting the operation of the process, if they cannot get to the normal operating asset performance, they may consider other actions, like calling a meeting with maintenance and engineering personnel to try to identify and fix the root cause. Since operations, maintenance and engineering are measured using the same asset performance measures a more collaborative and cooperative environment may result.

Engineering may use this information to evaluate both immediate and long term initiatives to increase the asset performance of the Crude Unit. The merits of any initiative they evaluate may be judged economically and not just technically since the asset value and opportunity cost may directly translate into a financials that will enable the calculation of both the ROI and cash flow improvements from any initiatives. If the engineers conclude that some advanced control strategies are required to increase the asset performance, they may estimate the expected asset performance improvement. Asset performance is directly tied to opportunity cost and asset value so the engineers can estimate the improvement value expected from the implementation of advanced controls and once the solution is implemented they can directly determine if the ROI and cash flow targets were achieved. This enables industrial companies to invest where they know they can get value.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. The computing system environment must have real-time access to the sensor-based data associated with the asset or asset set. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A system for producing a product by a process comprising:
    a processor executing a process control system configured to control a process, the process operating one or more assets thereof to produce products;
    one or more sensors coupled to the one or more assets of the process, said sensors configured for measuring real-time process data representative of at least one of:
        an amount of material input into the process,
        an amount of energy input into the process,
        an amount of an asset material consumed by the process,
        an amount of asset flow in the process, and
        an asset temperature of the process;
    a controller of the process control system configured to modify at least one of the amount of material input, the amount of energy input, the amount of asset material consumed, the amount of asset flow, and the asset temperature;
    a storage memory coupled to the processor, said storage memory storing the process data measured by the one or more sensors and processor-executable instructions, said processor-executable instructions, when executed by the processor, configuring the processor for:
        retrieving, from the storage memory, the process data from the one or more sensors;
        determining an input cost of the one or more assets based on the retrieved process data from the one or more sensors, said input cost comprising an energy cost and a material cost;
        determining an output value of the one or more assets based on the retrieved process data from the one or more sensors, based on the energy cost, and based on the material cost;
        providing a net production value of the one or more assets based on comparing the determined input cost and determined output value; and
        storing the determined input cost, determined output value, and net production value in the storage memory;
    said processor-executable instructions, when executed by processor, further configuring the processor for:
        executing asset performance models in real-time, the asset performance models modeling the one or more assets based on the retrieved process data from the one or more sensors and one or more of the determined input cost, determined output value, and net production value;
        sending one or more commands, based on the executed asset performance models, to the controller; and
        automatically operating control elements in the process by the controller in response to the commands, wherein the control elements are automatically operated by the controller to modify at least one of the amount of material input, the amount of energy input, the amount of asset material consumed, the amount of asset flow, and the asset temperature in such a way that the net production value increases; and
    one or more human-machine interface (HMI) systems coupled to the processor and responsive to the executed asset performance models, the HMI systems comprising a visual display based on the executed asset performance models of at least one of:
        a maintenance station presenting on its visual display information about a maintenance schedule or prior issues,
        an operator station presenting on its visual display real-time information as to current operation of an asset, and
        an engineering station presenting on its visual display trend information.

2. The system of claim 1, further comprising a business system coupled to the processor, said business system providing business data regarding current price of inputs and outputs of the one or more assets, where the input cost and the output value are determined based in part on the provided business data.

3. The system of claim 1, further comprising instructions for automatically scheduling maintenance of the one or more assets based on determined cost, determined value, and net production values.

4. The system of claim 1, wherein the input cost, output value, and net production value are calculated in real-time as the process data is gathered by the one or more sensors.

5. The system of claim 4, further comprising a historian database coupled to the storage memory wherein trend information and the input cost, output value, and net production value are stored in the historian database as they are calculated.

6. The system of claim 4, further comprising instructions for displaying changes in at least one of input cost, output value, and net production value in the form of a trend graph on the visual display of the one or more HMI systems.

7. The system of claim 1, further comprising instructions for determining an opportunity cost of the one or more assets based on the retrieved process data.

8. The system of claim 1, further comprising instructions for determining an asset performance value of the one or more assets based on the retrieved process data.

9. A method for producing a product by a process control system comprising:

executing, by a processor, a process control system configured to control a process, the process operating one or more assets thereof to produce products;

measuring, by one or more sensors coupled to the one or more assets of the process, real-time process data representative of at least one of:
  an amount of material input into the process,
  an amount of energy input into the process,
  an amount of an asset material consumed by the process,
  an amount of asset flow in the process, and
  an asset temperature of the process;

storing, in a storage memory coupled to the processor, the process data measured by the one or more sensors;

executing the processor-executable instructions to configure the processor for:
  retrieving, from the storage memory, the process data from the one or more sensors;
  determining an input cost of the one or more assets based on the retrieved process data from the one or more sensors, said input cost comprising an energy cost and a material cost;
  determining an output value of the one or more assets based on the retrieved process data from the one or more sensors, based on the energy cost, and based on the material cost;
  providing a net production value of the one or more assets based on comparing the determined input cost and determined output value;
  storing the determined input cost, determined output value, and net production value in the storage memory;
  executing asset performance models in real-time, the asset performance models modeling the one or more assets based on the retrieved process data from the one or more sensors and one or more of the determined input cost, determined output value, and net production value;
  sending one or more commands, based on the executed asset performance models, to a controller of the process control system; and
  automatically operating control elements in the process by the controller in response to the commands, wherein the control elements are automatically operated by the controller to modify at least one of the amount of material input, the amount of energy input, the amount of asset material consumed, the amount of asset flow, and the asset temperature in such a way that the net production value increases; and
  displaying, by one or more human-machine interface (HMI) systems coupled to the processor and responsive to the executed asset performance models, a visual display of at least one of the following based on the executed asset performance models:
    a maintenance station presenting on the visual display information a bout a maintenance schedule or prior issues,
    an operator station presenting on the visual display real-time information as to current operation of an asset, and
    an engineering station presenting on the visual display trend information.

10. The method of claim 9, further comprising receiving business data regarding current price of inputs into the process from a business system, where the input cost and the output value are determined based in part on the received business data.

11. The method of claim 9, further comprising automatically scheduling maintenance of the one or more assets based on determined cost, determined value, and net production values.

12. The method of claim 9, wherein the input cost, output value, and net production value are calculated in real-time as the process data is gathered by the one or more sensors.

13. The method of claim 12, wherein trend information and the input cost, output value, and net production value are stored in a historian database as they are calculated.

14. The method of claim 12, further comprising displaying changes in at least one of input cost, output value, and net production value in the form of a trend graph on the visual display of the one or more HMI systems.

15. The method of claim 9, further comprising executing the processor-executable instructions to further configure the processor for determining an opportunity cost of the one or more assets based on the received process data.

16. The method of claim 9, further comprising executing the processor-executable instructions to further configure the processor for determining an asset performance value of the one or more assets based on the retrieved process data.

* * * * *